United States Patent [19]
Hodge

[11] 4,010,981
[45] Mar. 8, 1977

[54] AIR CONVEYOR WITH TUNNEL GUIDE

[76] Inventor: Trevor A. Hodge, Maple Down, Crown Road, Buxton, Norwich NOR 61Y, England

[22] Filed: July 21, 1975

[21] Appl. No.: 597,623

Related U.S. Application Data

[63] Continuation of Ser. No. 399,356, Sept. 20, 1973, abandoned.

[52] U.S. Cl. .................................. 302/2 R; 302/31
[51] Int. Cl.² ............................................ B65G 51/02
[58] Field of Search ......................... 302/2 R, 29, 31

[56] References Cited
UNITED STATES PATENTS

| | | | |
|---|---|---|---|
| 3,105,720 | 10/1963 | Barker | 302/2 R |
| 3,210,124 | 10/1965 | Niemi et al. | 302/2 R |
| 3,350,140 | 10/1967 | Strydom | 302/31 |
| 3,684,327 | 8/1972 | Hurd | 302/29 |

*Primary Examiner*—Evon C. Blunk
*Assistant Examiner*—Jeffrey V. Nase
*Attorney, Agent, or Firm*—Patrick J. Walsh

[57] ABSTRACT

An air conveyor includes a plenum and a perforated deck plate for communicating air to the surface of the deck plate for moving articles along the deck plate surface. A tunnel member confronts the deck plate for trapping and conserving the conveying air for moving objects along the conveyor. In the preferred embodiment, the air conveyor is arranged vertically as a lift conveyor.

9 Claims, 4 Drawing Figures

AIR CONVEYOR WITH TUNNEL GUIDE

This application is a continuation of application Ser. No. 399,356 filed Sept. 20, 1973, now abandoned.

Air conveyors for vertically lifting objects are known in the prior art. The U.S. Pat. No. 3,105,720 to Barker is directed to a "Pneumatic Conveying System" in which an air conveyor is disclosed for moving objects such as can bodies vertically from a lower to a higher elevation. In the Barker apparatus the vertical lift is accomplished by a pair of spaced, vertically oriented air conveyors which confront the conveyed articles. The cans being conveyed are positioned between the spaced air conveyor sections. Conveying air issues from the spaced air conveyor sections and lifts the articles being conveyed.

The present invention provides a new and improved air conveyor particularly suited to vertical lift applications. In a preferred embodiment the present invention includes an air conveyor oriented vertically and combined with a tunnel guide member. The air conveyor includes an elongated plenum chamber having a perforated deck plate or conveyor surface with one or more rows of slots extending along the conveyor for forming directional air jets. The plenum chamber is closed except for the slots in the conveyor surface. A fan or other means supplies pressurized air to the plenum chamber. A tunnel guide member confronts the directional air jets and extends along the conveyor surface to define a conveying zone through which articles move as the air conveyor functions. The conveying zone thus defined substantially encloses the conveyed articles. The tunnel guide member includes an imperforate wall with a shape selected to conform with the articles being conveyed. For example, a tunnel guide having a "U"-shaped or rectangular cross section may be used for consumer frozen food cartons. The tunnel guide is mounted on the air conveyor to provide an air gap between the conveyor surface and the adjacent side edges of the tunnel guide member.

In a preferred form the improved air conveyor is arranged with its longitudinal axis oriented vertically or substantially so. The air conveyor issues conveying air in the form of directional air jets through the air conveyor slots. The slots are preferably incised in the air conveyor surface and configured to create directional air jets having a major flow component along the conveyor surface. Articles are introduced into the conveying zone defined by the conveyor surface and the imperforate tunnel guide member. The directed conveying air is trapped and conserved within the conveying zone for improved conveying action. Articles move through the conveying zone under the influence of the conveying air. A small air space exists between the surfaces of each conveyed article and the corresponding surfaces of the tunnel guide and the air conveyor thereby to minimize frictional retardation of the articles moving through the conveying zone. Excess air spills from the conveying zone through air gaps provided between the marginal edges of the tunnel guide wall and the conveyor surface to prevent the buildup of undesired back pressure within the conveying zone.

If desired an air conveyor according to the present invention may be oriented in any position between the horizontal and the vertical.

An object of the present invention is to provide an air conveyor for conserving conveying air to obtain improved conveying efficiency.

Another object of the present invention is to provide an improved vertical lift air conveyor.

A further object of the invention is to provide an air conveyor having a tunnel guide member for trapping and conserving conveying air to improve air conveyor efficiency especially in vertical lift air conveyors.

Other and further objects will become apparent upon an understanding of the following specification or will occur to one skilled in the art upon employment of the invention in practice.

A preferred embodiment has been chosen for illustrating the invention and is shown in the accompanying drawing in which.

Figure 4:
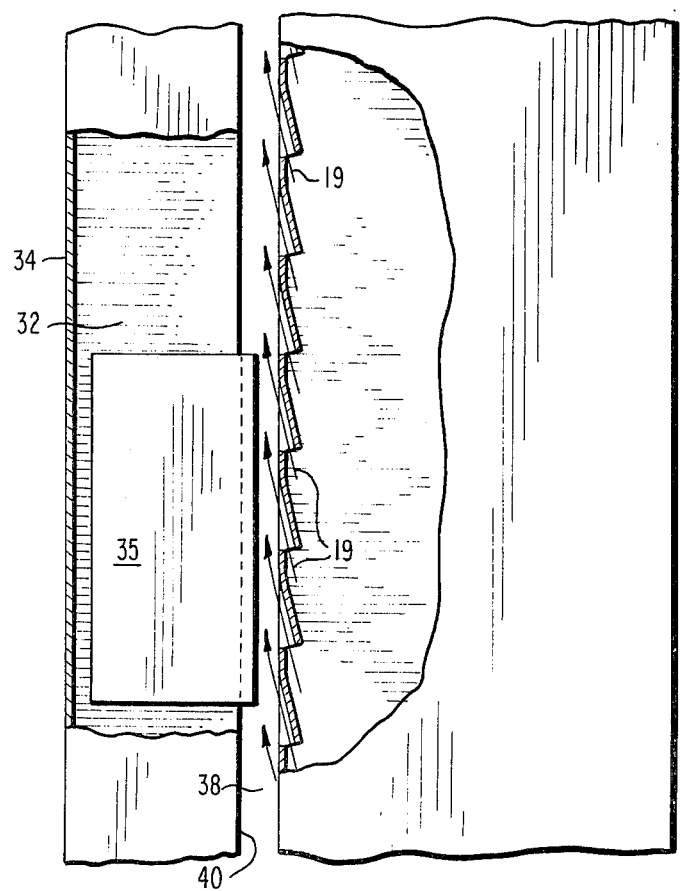
FIG. 4 is an enlarged fragmentary view of FIG. 2 partly broken away to expose interior detail.

Referring to the drawing, the preferred embodiment of the invention comprises a vertically oriented air conveyor 10 having a perforated deck plate 12 defining a conveying surface 14. The deck plate is typically perforated with one or more longitudinally extending rows of slots 15 incised into the deck surface 12. The slots 16 are configured to issue air from the plenum in the form of a jet having a predominantly vertical flow component above the deck plate 14 for propelling an article along the conveyor. As best shown in FIG. 4, the slots 16 are incised into the deck plate 12 so that pressurized air within the plenum 17 flows through the deck in the form of air jets represented by arrows 19. A plenum chamber 17 having a bottom wall 18, side walls 20, and end walls 22 extends along the length of the deck plate for supplying air under pressure through the deck plate slots 16. Pressurized air delivered by a suitable fan 24 enters the plenum and passes through the deck plate slots in the form of directional air jets having a predominant flow component extending along the deck surface. The air jets move objects along the conveyor surface. It will be understood that the conveying air is effective to lift each conveyed article off the deck surface so that each carton moves along a cushion of air with little or no contact between the conveyor surface and the conveyed article.

In accordance with the present invention, a tunnel guide member 30 confronts the air conveyor and extends along the length thereof. The air conveyor together with the tunnel guide member define a conveying zone 32 in which the conveying air is trapped and conserved. The tunnel guide comprises an imperforate wall member 34 mounted in confronting relation to the air conveyor 10 for the purpose of trapping and conserving the conveying air.

Figure 1:
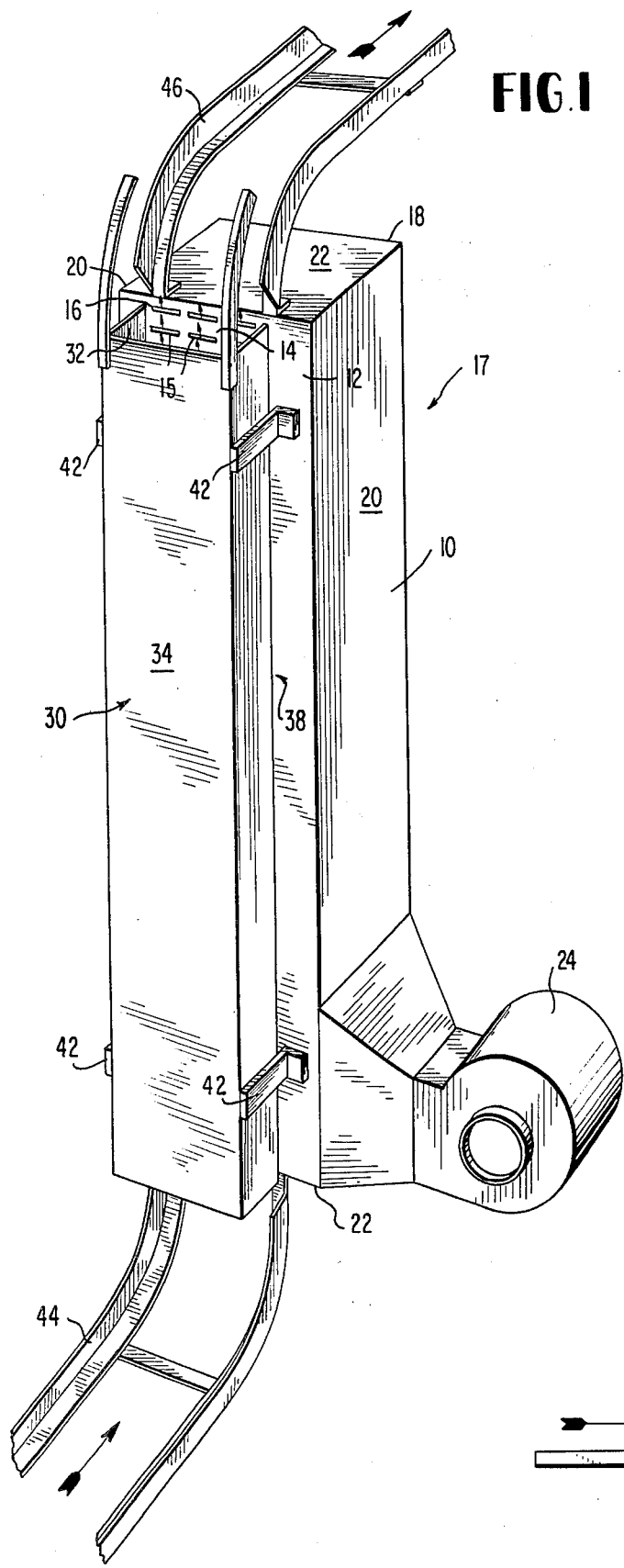
FIG. 1 is a perspective view of an air conveyor according to the invention.
Figure 2:
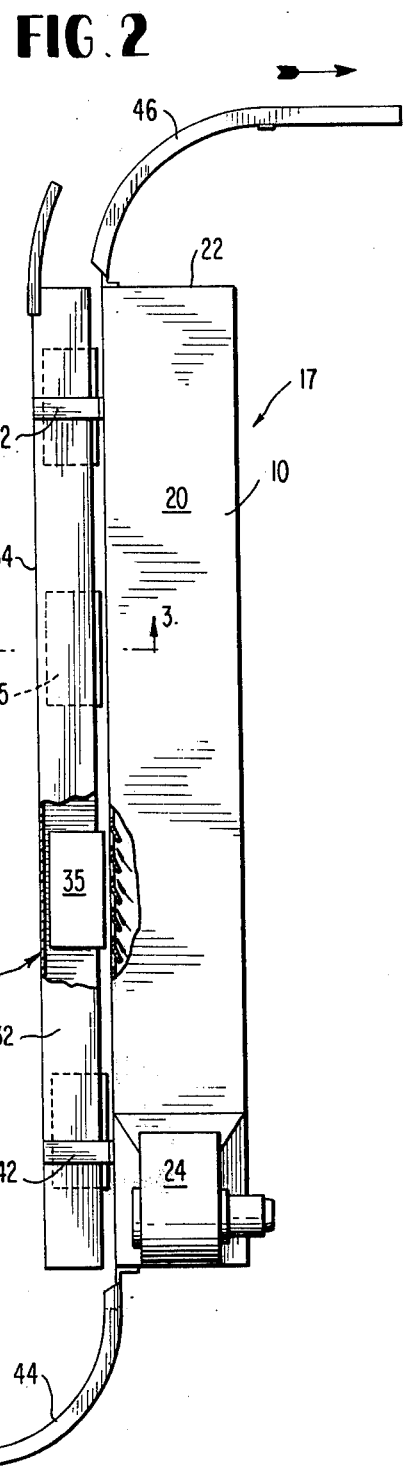
FIG. 2 is a side elevation view thereof.
Figure 3:
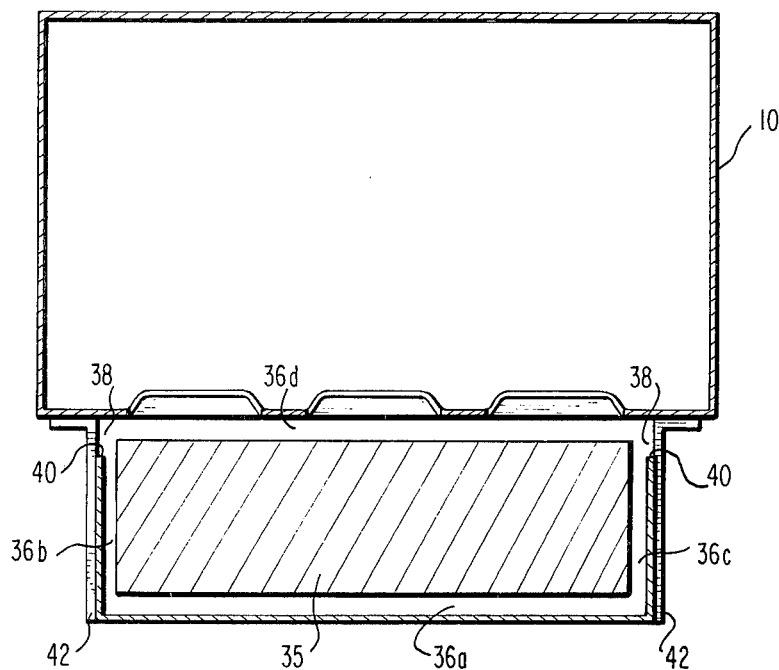
FIG. 3 is a section view taken along line 3—3 of FIG. 2.

The tunnel guide member 30 is configured in relation to the article being conveyed so that small air gaps exist between the article surfaces and those of the tunnel wall. In the drawing FIG. 3, the article conveyed is a carton such as a consumer frozen food carton 35 and accordingly the tunnel guide is of rectangular cross section to provide small air gaps 36 a, b, and c between the carton and the tunnel walls. Each carton is also spaced from the conveyor surface 14 by a gap 36 d. By this arrangement the conveying air achieves improved effectiveness in moving cartons through the conveying zone. The cartons move through the conveying zone on a cushion of air with minimal frictional contact with the tunnel wall or deck plate. As best shown in FIGS. 3 and 4, an air gap 38 is provided between each side wall edge 40 of the tunnel guide 30 to permit a limited escape of air from within the conveying zone to prevent build up of back pressure within the conveying zone 32. Typically the air exhaust gap may be one-quarter inch (0.25 inch) wide.

The tunnel guide member may be mounted by suitable support brackets 42 on the air conveyor.

An infeed conveyor 44 supplies articles to the lift conveyor and a take-off conveyor 46 removes them.

In operation, an article such as a carton 35 is conveyed by the infeed conveyor 44 into the lift conveyor. The carton moves into the conveying zone 32 defined by the air conveyor deck plate 14 and the tunnel guide member 30. Air jets issuing from the perforated deck plate are directed upwardly along the deck plate surface and convey the carton 35 vertically through the conveying zone 32. The tunnel guide member traps and conserves the conveying air around and behind the carton to concentrate the pressurized conveying air for improved lifting ability of the air conveyor. The trapped air "cushions" or separates the carton from the inner surfaces of the tunnel guide member as well as from the deck plate surface thereby to minimize frictional contact between the carton and the conveyor. At the upper level of the conveyor, take-off conveyor 46 receives and conveys the cartons to their destination.

It will be understood from the foregoing description that the air conveyor may be oriented vertically or at any angle between the vertical and horizontal for lifting conveyed objects.

Applicant has provided a new and improved air conveyor particularly suited to vertical lift applications in which conveying air is utilized with greater effectiveness in vertical lift conveying.

I claim:

1. An air conveyor for vertically lifting articles having a generally uniform exterior configuration comprising a plenum chamber, means for supplying pressurized air to the plenum chamber, a deck plate covering said plenum chamber and having a plurality of slots therein configured to issue pressurized air from the plenum in the form of directional air jets having a predominant flow component along the surface of the deck plate, an imperforate wall member mounted in spaced relation to the deck plate and being in confronting relation to the deck plate slots, said wall member extending along said deck plate and together with said deck plate defining a conveying zone to trap and conserve the conveying air, said wall member having an interior surface conforming to the exterior surface of the articles conveyed and defining a small air space between the interior surface of said wall member and each of said articles, said wall member having at least one edge extending substantially the full length of the wall member, air gap means extending substantially the full length of said wall member along said edge providing for limited escape of air from within the conveying zone to prevent the buildup of air back pressure within said zone, means supporting said air conveyor in a direction having a substantial vertical component for moving articles from a lower to a higher elevation, and said imperforate wall member and said deck plate together provide a cross-section substantially similar to the cross-section of the articles being conveyed.

2. An conveyor as defined in claim 1 which further includes an inlet conveyor and a take-off conveyor.

3. An air conveyor as defined in claim 1 which has its axis in the longitudinal direction arranged vertically.

4. An air conveyor as defined in claim 1 in which the deck plate slots are arranged in a plurality of longitudinally extending rows.

5. An air conveyor as defined in claim 1 in which said air gap means is defined by a space between the deck plate and at least one marginal edge of said wall member.

6. An air conveyor for vertically lifting articles having a similar exterior configuration comprising a plenum chamber, means for supplying pressurized air to the plenum chamber, a deck plate covering said plenum chamber and having a plurality of slots therein configured to issue pressurized air from the plenum in the form of directional air jets having a predominant flow component along the surface of the deck plate, an imperforate wall member mounted in spaced relation to the deck plate and being in confronting relation to the deck plate slots, said wall member extending along said deck plate and together with said deck plate defining a conveying zone to trap and conserve the conveying air, said wall member having an interior surface conforming to the exterior surface of the articles conveyed and defining a small air space between the interior surface of said wall member and each of said articles, said wall member having two edges extending substantially the full length of the wall member, air gap means extending substantially the full length of said wall member along said edges providing for limited escape of air from within the conveying zone to prevent the buildup of air back pressure within said zone, means supporting said air conveyor in a direction having a substantial vertical component for moving articles from a lower to a higher elevation, and said imperforate wall member and said deck plate together provide a cross-section substantially similar to the cross-section of the articles being conveyed.

7. An air conveyor for vertically lifting articles having a generally uniform exterior configuration comprising a plenum chamber, means for supplying pressurized air to the plenum chamber, a deck plate covering said plenum chamber and having a plurality of slots therein configured to issue pressurized air from the plenum in the form of directional air jets having a predominant flow component along the surface of the deck plate, a U-shaped imperforate wall member mounted in spaced relation to the deck plate and being in confronting relation to the deck plate slots, said wall member extending along said deck plate and together with said deck plate defining a conveying zone to trap and conserve the conveying air, said wall member having an interior surface conforming to the exterior surface of the articles conveyed and defining a small air space between the interior surface of said wall member and each of said articles, said wall member having two marginal edges adjacent the deck plate extending substantially the full length of the wall member, air gap means extending substantially the full length of said wall member along each of said marginal edges providing for limited escape of air from within the conveying zone to prevent the buildup of air back pressure within said zone, means supporting said air conveyor in a direction having a substantial vertical component for moving articles from a lower to a higher elevation, and said imperforate wall member and said deck plate together provide a cross-section substantially similar to the cross-section of the articles being conveyed.

8. An air conveyor as defined in claim 7 in which the U-shaped wall member defines a conveying zone having a substantially rectangular transverse cross-section.

9. An air conveyor as defined in claim 7 in which said wall member is mounted on the deck plate by means of brackets which space the wall member from the deck plate surface thereby to define said air gap means.

* * * * *